United States Patent [19]

Kiser

[11] Patent Number: 4,960,041

[45] Date of Patent: Oct. 2, 1990

[54] REGULATION OF ATMOSPHERIC CONDITIONS WITHIN A CONFINED SPACE

[75] Inventor: Thomas E. Kiser, Fremont, Ohio

[73] Assignee: Professional Supply, Inc., Fremont, Ohio

[21] Appl. No.: 350,256

[22] Filed: May 11, 1989

Related U.S. Application Data

[62] Division of Ser. No. 124,912, Nov. 27, 1987, Pat. No. 4,850,264.

[51] Int. Cl.⁵ .............................................. B64D 13/00
[52] U.S. Cl. ...................................... 98/1.5; 236/49.3
[58] Field of Search .................. 98/1.5, 33 A; 165/16; 236/49

[56] References Cited

U.S. PATENT DOCUMENTS

| | | | |
|---|---|---|---|
| 3,402,654 | 9/1968 | Berst | 98/1.5 |
| 4,407,185 | 10/1983 | Haines et al. | 98/1.5 |
| 4,581,988 | 4/1986 | Mattei | 98/1.5 |

Primary Examiner—Henry A. Bennet
Attorney, Agent, or Firm—Richard C. Darr

[57] ABSTRACT

An improved system for maintaining atmospheric conditions within prescribed parameters throughout the interior of a building. The building interior is essentially an enclosed system and sufficient outside air is admitted through air handling units to continuously maintain the interior of the building under a slight positive pressure throughout. Controllable vents are provided at strategic locations around the perimeter of the building, and sensing units are located throughout the building to continuously monitor atmospheric conditions such as temperature, humidity, and the level of particulates and pollutants. The sensing units or monitoring stations are periodically polled by a central computer, with signals from each station providing an indication of atmospheric conditions at that station. The signals representing existing atmospheric conditions are compared with stored data indicative of prescribed parameters for desired atmospheric conditions at the stations. Signals are generated in repsonse to noted deviations from the prescribed parameters, and the signals are utilized to regulate the controllable vents and air handling units so as to modify the incoming air or cause air to be discharged through appropriate vents in the area of the monitoring station until atmospheric conditions again fall within the prescribed parameters. Air is thus delivered from the air handling units to specified areas in a controlled manner without the use of ductwork.

16 Claims, 2 Drawing Sheets

REGULATION OF ATMOSPHERIC CONDITIONS WITHIN A CONFINED SPACE

This application is a division of application Ser. No. 07/124,912, filed Nov. 27, 1987 now U.S. Pat. No. 4,850,264.

BACKGROUND OF THE INVENTION

1. Field of the Invention

The present invention pertains broadly to a ductless system for conditioning the air within the interior of an enclosed building, and more particularly to such a system utilizing a global control concept wherein the interior of the building is maintained at a pressure greater than the outside atmosphere, and air is emitted at various points around the perimeter of the building in controlled amounts in response to observed atmospheric conditions at corresponding locations within the building, so that conditioned air migrates to the locations as needed to maintain the atmospheric conditions within prescribed parameters.

2. Description of the Prior Art

Industrial-type buildings heretofore have generally been heated from a central heating plant, with ducts or pipes delivering heated air, steam or hot water as a heat carrying medium to various areas of the building for distribution of the heat. Cooling is likewise provided by delivering conditioned air from a central unit or units through ductwork to specific discharge areas. Ventilation is provided by extracting stale or polluted air, often with the assistance of a large number of fans, through vents in the roof or walls.

There has heretofore been little or no correlation between the heating or cooling and the ventilation. Due to the manner in which the heating and/or cooling is effected, substantial temperature differentials are created in different areas of the building as well as at different elevations within the building. The ductwork and piping necessary to distribute the heating or cooling medium is costly to install and maintain and, due to frictional losses within the ductwork and piping systems, significant amounts of energy are expended in operating them.

In recent years direct-fired space heating units have been developed for heating relatively large industrial type buildings as disclosed, for example, in U.S. Pat. No. 3,398,940 to Kosarin and U.S. Pat. Nos. 3,542,373, 4,325,352 and 4,429,679 to Dirkes. Such units are generally located exteriorly of the building, as on the roof thereof, and include a sheet metal cabinet housing a burner and a fan. The fan draws fresh air from the outside, as well as return air from the interior of the building. A portion of the fresh air is drawn over the burner to be heated, and the remaining fresh air is mixed with recirculated building air in selected proportions. The heated and unheated air are combined downstream from the burner and discharged into the building to maintain the building interior at a desired temperature and pressure. Such units allegedly maintain temperature and pressure at desired levels by altering, on demand, the complementary proportions of outside air and recirculated building air passing through the unit or units for discharge into the building. No ductwork is employed, and once the air is discharged into the building its movement is randomly affected by various factors such as building infiltration, exfiltration, convection currents, heat producing activities in various areas of the building, air density differentials and ventilation systems. Thus, while the space heating units themselves may perform very well, their operation often results in objectional and uncontrollable hot or cold areas within the building. Furthermore, they are not effective in removing airborn pollutants and contaminants from, or controlling humidity in, localized areas of the building.

Various ventilating systems have been proposed, particularly for poultry and livestock buildings, which employ adjustable dampers in air inlets or outlets for regulating air inflow or outflow. Such devices typically include a wall or roof vent having an adjustable shutter or louver which is operable by a servomotor. The servomotor may be centrally controlled to appropriately set the shutter in response to signals indicative of, for example, temperature or humidity so that varying amounts of air can be admitted or exhausted through the shutter at a more-or-less uniform velocity.

SUMMARY OF THE INVENTION

In accordance with the present invention, there is provided an improved system utilizing a global control concept for maintaining atmospheric conditions within industrial-type buildings. The building interior is substantially isolated and conditioned air, including sufficient outside air, is continuously admitted through air handling units to maintain the interior of the building under a slight positive pressure, that is, at a pressure slightly greater than the surrounding outside atmosphere. Sensors strategically located throughout the building monitor various atmospheric conditions such as temperature, humidity, air pressure, pollutants and particulate content, and generate appropriate signals indicative of the readings for transmittal to a central computer. The computer periodically monitors the signals from each sensor and compares them to stored data representing desired paramaters for the atmospheric conditions in the various zones monitored by the sensors. Controllable air handling units, and vents or relief dampers strategically located around the perimeter of the building, are adapted to be individually regulated by signals from the central computer. Thus, when the computer detects a trend for a pressure, temperature, or atmospheric condition to fall outside the predetermined parameters in a particular zone, it sends a signal appropriately adjusting the air handling unit or the relief damper or dampers associated with that zone to implement corrective action. Thus, the air handling unit may be instructed to heat or cool the air as necessary as well as to increase or decrease the proportion of incoming outside air so as to maintain the desired level of positive pressure in the zone. Appropriate relief dampers may also be opened. As a result, air exhausted through the relief dampers or vents is replaced by conditioned air until the trend is reversed and atmospheric conditions within the zone or zones again fall within the predetermined parameters as ascertained by the computer from signals supplied by the appropriately located sensors. The computer then instructs the relief dampers or vents to be throttled down or closed, as the case may be, to maintain atmospheric conditions within the prescribed parameters.

It is, therefore, a primary object of the invention to provide an improved system for the heating, ventilating and air conditioning of industrial-type buildings.

Another object of the invention is to provide such a system which assures that atmospheric conditions will be continuously maintained within prescribed parameters throughout the buildings.

Another object of the invention is to provide such a system which is relatively inexpensive to install, operate and maintain.

Still another object is to provide such a system which does not require the installation of ductwork throughout the building.

Yet another object of the invention is to provide such a heating, ventilating and air conditioning system which is extremely energy efficient.

Other objectives and advantages of the invention will become more apparent during the course of the following description, when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENTS

Figure 1:
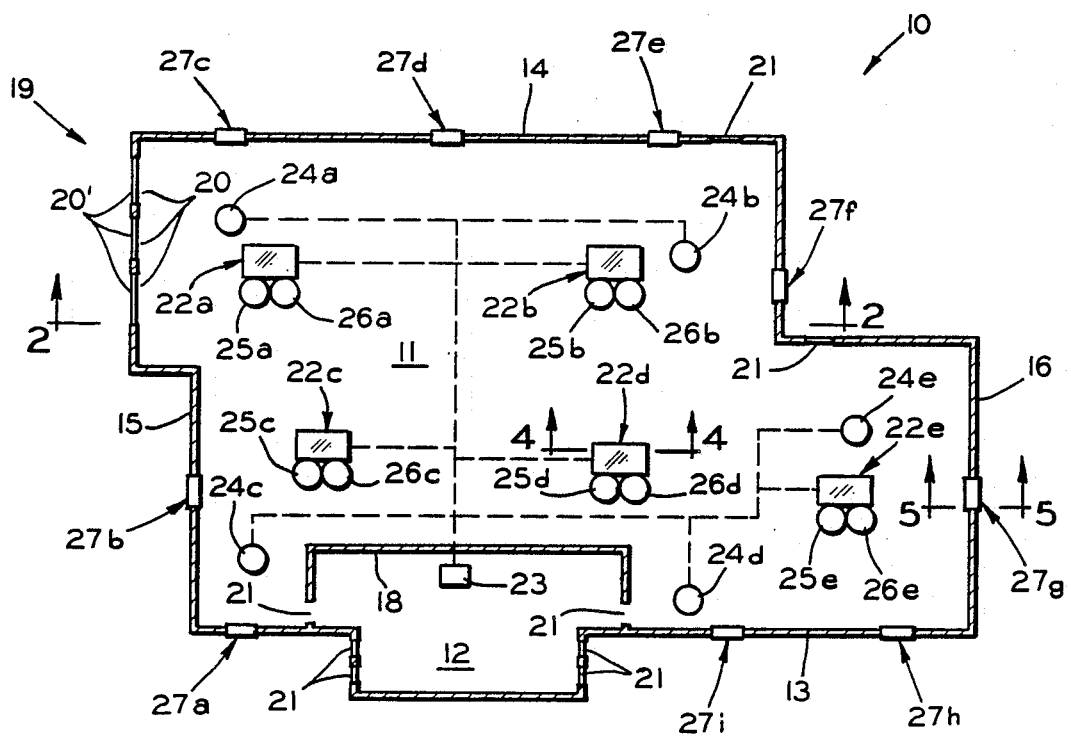
FIG. 1 is a plan view of an industrial-type building embodying the invention.

Referring now to the drawings, and particularly to FIG. 1, there is shown generally at 10 a conventional industrial-type building embodying the invention. It will be readily appreciated that the illustrated building is merely typical of such buildings for housing industrial plants, warehouses and the like, and that buildings of various configurations and sizes ranging from a few thousand to several hundred thousand square feet or more, may utilize the invention. Such buildings typically include a large open area 11 in which manufacturing or warehousing activities are carried on, and a smaller enclosed area 12 utilized for office or administrative purposes. The building structure generally comprises front and rear walls 13 and 14, respectively, interconnected by oppositely disposed end walls 15 and 16. A suitable roof structure 17, generally of the flat type, covers the open area of the building 10 or, as illustrated in FIG. 1, may extend into the main portion of the building and be separated from the open area 11 by an interior wall 18 and suitable ceiling (not shown). Various types of openings may be provided in the walls as deemed appropriate for access to the building. To that end the building may include a loading dock area 19 provided with one or more large doorways 20 adapted to accommodate trucks or railroad cars for receiving and shipping goods. In addition, the building may include conventional doors 21 at various locations for permitting access to the building by workers, and the walls may include windows (not shown) for admitting light.

As indicated above, it is known in the art to construct buildings for operation under pressurization, that is, having their interior maintained at a pressure slightly above the surrounding outside atmospheric pressure. Heretofore, such buildings have generally been provided with a system of ductwork for distributing conditioned air throughout the building from a single central source. Conditioned air is discharged by the ductwork at various locations throughout the building, and the building interior is consequently assumed to be under a positive pressure throughout. In actual practice such has not been found to be the case, however. Thus, it is not economically feasible to construct buildings of this type which are air-tight. In addition, workers tend to open windows or doors for ventilation purposes, and the large doors in the loading dock area must be periodically opened for receiving or shipping goods. Such random leakage, without any means to detect and compensate for pressure variations, results in uncontrolled air movement within the building. Studies have shown that due to this and a number of other factors, including external wind conditions, such buildings believed to be operating under pressurization very often actually have areas exhibiting negative pressure, resulting in uncontrolled infiltration of outside air.

The need for expensive and inefficient ductwork and the existence of areas of negative pressure within the building are eliminated, and desired atmospheric conditions are maintained in accordance with the present invention, by utilization of the aforementioned global control concept. To that end there is located on the roof 17 of the building 10 a number of air handling units 22 for directing conditioned air into the interior of the building as will be hereinafter described. The air handling units are of conventional construction such as those sold as the Rapid 3000 model by Rapid Engineering Inc. of Grand Rapids, Mich. The number and location of the units will, of course, depend upon the size and configuration of the building, and may be determined upon the basis of manufacturers recommendations.

The building illustrated in FIG. 1, for example, employs five of the air handling units, designated 22a through 22e, distributed so as to assure ready delivery of air from the units to all areas of the building. While the units have been shown positioned on the roof of the building as they normally would be for large buildings, it is contemplated they may alternatively be positioned on the ground around the perimeter of smaller buildings. As will be hereinafter more fully explained, the individual air handling units 22 are linked to and controlled by a central computer 23 located as in the enclosed office or administrative area 12.

Despite the care with which they are constructed, buildings of this type invariably have openings such as cracks and gaps in the walls and poorly sealed doors and windows through which air can pass. Inasmuch as the building interior is constantly maintained under a positive pressure, there is a natural and continuous movement of air toward all openings, with the incoming air from the air handling units 22 naturally gravitating toward the openings. The openings are randomly located and their capacity to transmit air is unknown and may actually fluctuate due to the opening and closing of doors and windows and the effect of outside air currents. The systems employed heretofore failed to recognize the significance of pressure differences in different areas and were not capable of responding to localized pressure fluctuations. Furthermore, since they did not provide for systematically controlling the rate and location of air exfiltration from the building, they were not able to replace or modify the atmosphere in selected locations.

The above-noted deficiencies are overcome in accordance with the global control concept of the present invention. To that end there is provided at strategic locations throughout the building 10 a series of pressure sensors 24 for continuously monitoring the air or atmospheric pressure at their various locations. The pressure sensors, five of which are illustrated in FIG. 1 and designated 24a through 24e, are linked to the central computer 23, which periodically polls them to receive a signal indicative of the current air pressure of each location. Also strategically located throughout the building and similarly linked to the central computer 23, are temperature sensors 25 and additional sensors 26 such as air quality monitors. The sensors may be of conventional construction of types commercially available such as well-known opacity and hydrocarbon units. Again, five such temperature and air quality sensors have been schematically illustrated in the drawings and designated 25a through 25e and 26a through 26e, respectively. Each of the sensors 25 and 26 has been shown as being positioned adjacent to and below an air handling unit 22. However, they are not directly associated with an air handling unit and it wil be appreciated they may be located as deemed appropriate to monitor atmospheric conditions in various areas of the building. Likewise, it will be understood additional sensors may similarly be provided for monitoring specific conditions such as humidity, and the concentration of particulate matter, smoke or haze, pollutants and specific vapors and gases.

Present day buildings of this type are generally constructed so as to be capable of pressurization for ventilation purposes. To that end they preferably do not include windows which can be opened and closed at will, although the global control system of the present invention is able to compensate for such random leaks. The large doorways 20 at the loading dock area 19 are provided with easily openable and closeable doors such as conventional power-operated overhead doors 20'. The doors may be provided with an alarm means (not shown) providing an audible signal when they remain open for more than a prescribed period. The smaller doors 21 are preferably of the self-closing type to minimize the likelihood of their being left open so as to act as an uncontrolled air outlet.

Figure 2:
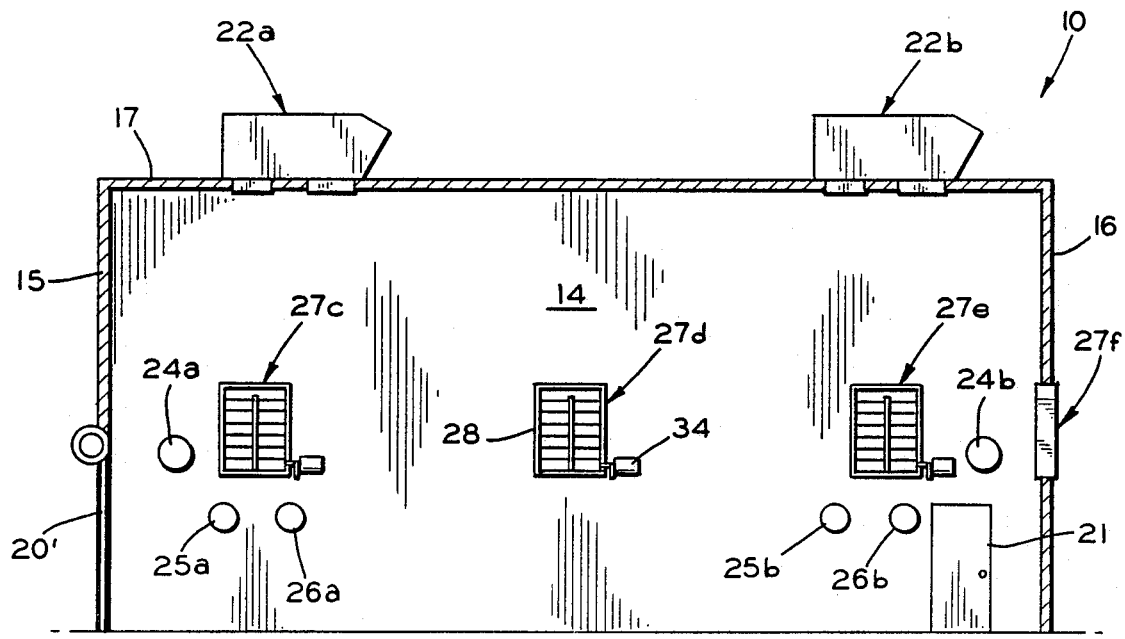
FIG. 2 is a vertical section taken substantially along line 2—2 of FIG. 1.
Figure 5:
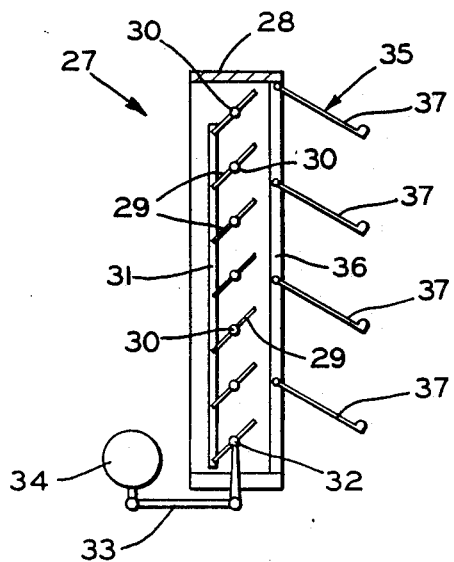
FIG. 5 is a transverse, vertical section through a relief damper vent, taken substantially along line 5—5 of FIG. 1.

In order to selectively discharge air from, and thereby to regulate air movement within the building, there is provided in the walls 13, 14, 15 and 16 at spaced intervals around the perimeter of the building, a plurality of adjustable relief dampers or vent units 27. The relief dampers are remotely controllable and may be of a standard construction such as those sold under the designation D640A by Honeywell Inc. As best seen in FIGS. 2 and 5, the dampers comprise a rectangular framework 28 within which is mounted a number of louvers 29 for pivotal movement about their longitudinal axes upon shafts 30. The louvers are of such width that when in the closed position they overlap one another to effectively prevent the passage of air through the vent unit. The louvers 29 are interconnected by a tie bar 31 for simultaneous movement; and a shaft extension 32 on one of the louvers is connected by linkage 33 to a control motor 34. Thus, by manipulation of the control motor to move the linkage 33 and thereby to rotate the shaft extension 32, the louvers 29 may be moved and positioned so that the relief damper unit 27 is anywhere between a full open and a full closed configuration. The control motor is operatively linked to the central computer 23 and may, for example, be of the type available from Honeywell Inc. as the Modutrol Model M744S. For purposes of economy and simplicity of installation, where appropriate the control motor may be controllably linked to the computer through existing building wiring by means of transceivers such as the Honeywell Inc. Model TR7408. The motor and computer can, of course, also be linked by a conventional twisted light wire system.

In order to prevent backdrafts and minimize the effect of wind on the pressure within the building, the vent units 27 are preferably provided on their exterior side with a conventional gravity backdraft damper system 35. More particularly the backdraft system, as best illustrated in FIG. 5, comprises a mounting frame 36 to which are affixed along their upper longitudinal edges a plurality of lightweight flexible vanes 37. The vanes are sufficiently rigid to normally stand outwardly in parallel relationship as shown in FIG. 5 so long as the pressure against their inner surface equals or exceeds the pressure against their outer surface. However, if the exterior pressure exceeds the interior pressure as when the wind blows toward them, the vanes will deflect downwardly in overlapping, closed relationship to prevent air flow inwardly through the vent unit. When the exterior pressure diminishes, they snap back to their open position.

As hereinabove mentioned, the air handling units 22 are of a type generally commercially available and, as will be seen in FIG. 1, are positioned at suitable locations on the roof structure 17 so that when operated in conjunction with the global control system of the invention they will readily supply adequate amounts of conditioned air for pressurizing all areas of the building. Such units are disclosed, for example, in U.S. Pat. No. 4,429,679 to Dirkes. The units are designed to deliver a composite of thermally conditioned outside air, raw outside air and recirculated indoor air into the building interior, and to modulate the proportions so as to deliver the composite air at the desired temperature and with a volume of outside air to maintain the desired pressurization within the building.

To that end, the units 22 comprise a box-like housing 38 of generally rectangular configuration having at one end a protective weather hood 39 enclosing first and second outside air inlet openings 40 and 41, respectively. The openings 40 and 41 are provided with adjustable dampers 42 and 43, respectively, for regulating the flow of incoming outside air as will be more fully explained. A third air inlet 44, communicating with the interior of the building, has an adjustable damper 45 for regulating the entry of return air from the interior of the building. The flow path of the incoming air from the first air inlet opening 40 is separate from that of the second and third openings 41 and 44 by a partition wall 46 extending between the side walls of the housing 38. The housing interior thus comprises three basic chambers, a first chamber 47 through which incoming air from the first air inlet opening 40 flows, a second chamber 48 through which incoming air from the second and third air inlet openings 41 and 44 flows, and a third chamber 49 downstream wherein the flow from the first two chambers is combined. The damper 43 in the inlet opening 41 is conventionally linked to operate in opposition to the damper 45 in the inlet opening 44, that is, as the damper 43 opens or closes to admit more or less outside air, the damper 45 correspondingly closes or opens to admit less or more return air. In other words, the flows of outside and return air complement one another so as to provide uniform flow through the second chamber 48.

Located within the first chamber 47 and in the flowpath from the first air inlet opening 40 is a direct fired gas burner 50 of the open flame type. Outside air drawn through the first chamber is thus heated in passing over the burner before entering the third chamber 49. It will be appreciated that where desirable, air filters may be incorporated into the chambers 47, 48 or 49 as suggested by the aforementioned U.S. Pat. No. 4,429,679. Likewise, it is fully anticipated that cooling unit heat exchangers (not shown) may as well be installed in the chambers 48, 49 or 50 in a conventional manner for purposes of providing cooled air to the building interior.

A bulkhead 51 and fan shroud 52 are provided within the third chamber 49 for mounting an associated fan impeller wheel or blower 53. The impeller wheel is affixed to a shaft 54 for rotation as by a suitable drive motor 55 through pulleys 56 and 57 and a belt 58. The rotating impeller wheel thus draws air through the chambers 47 and 48 and directs it downwardly into the interior of the building through an outlet 59 in the housing 38 of the air handling unit 22. Operation of the dampers 42, 43 and 45, the burner 50 and the impeller or blower 53 are all under the control of the computer 23 as will be hereinafter described.

Figure 3:
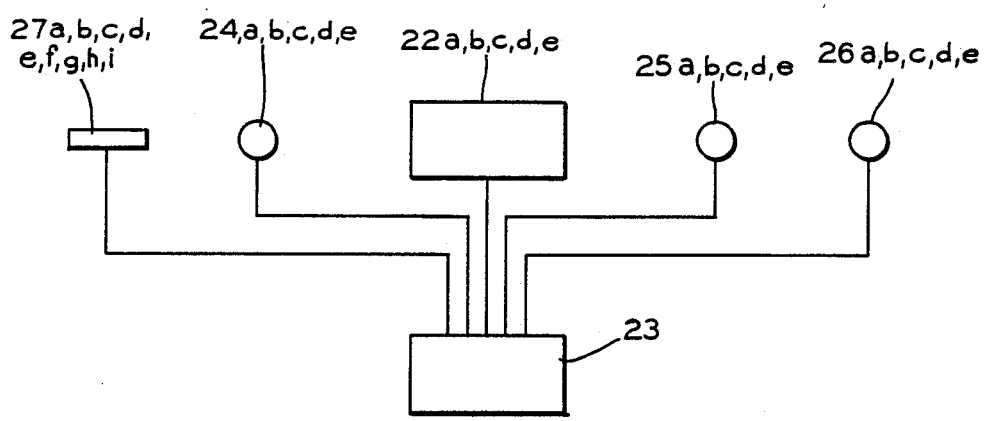
FIG. 3 is a diagram schematically illustrating the global control system of the invention.
Figure 4:
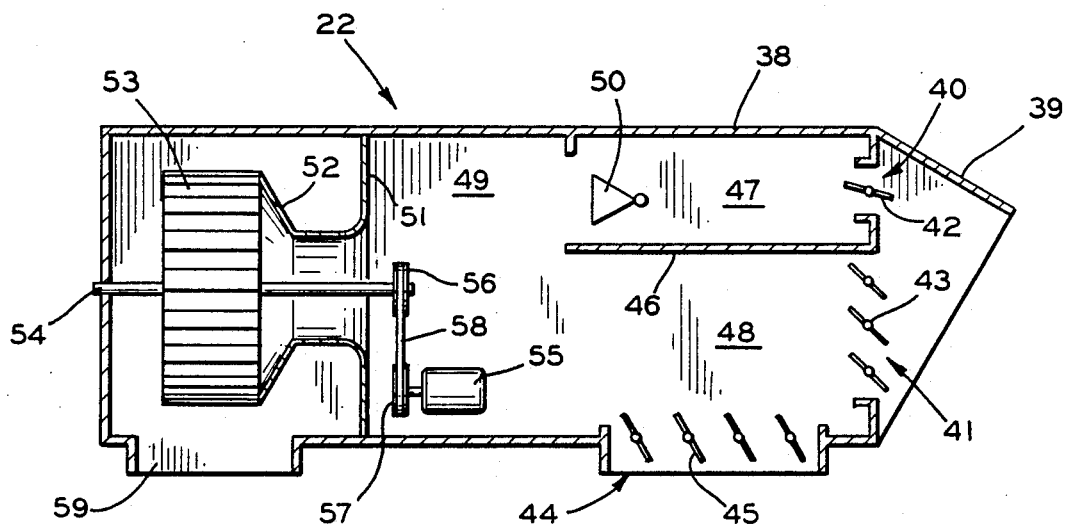
FIG. 4 is a vertical section taken substantially along line 4—4 of FIG. 1, through a typical air handling unit employed in the invention.

As shown schematically in FIG. 3, the controls for the air handling units 22a through e and the vent units 27a through i, as well as the pressure sensors 24a through e, the temperature sensors 25a through e, and the air quality sensors 26a through e, are all linked to the central computer 23. Communication between the computer and the sensors, air handling units and vent units may, again, where appropriate, be through the building wiring network utilizing conventional transceivers, or may be by means of a simple twisted light wire arrangement.

Under normal conditions, once the system is put in operation the impeller wheel or blower 53 operates continuously at a constant velocity to draw air through the first and second chambers 47 and 48 and into the third chamber 49 for discharge into the building through the outlet 59 at a fixed velocity. Air handling units 22 of the type employed in the invention are designed so that during the heating season the burner 50 is continuously on, with a variation on the order of 25 to 1 between its maximum and minimum rate of gas consumption to provide the required variation in heat output. The ratio between the size of the chambers 47 and 48 is such that about one fifth of the air drawn into the chamber 49 will enter through the chamber 47 and four fifths will enter through the chamber 48. Thus, at any time the burner 50 is in operation, twenty percent of the incoming air will be outside air passing through the chamber 47 to insure complete combustion at the burner and to carry the heat from the burner into the chamber 49 and thus into the building.

Since the dampers 43 and 45 are interconnected to operate in opposed fashion, the incoming air drawn through operate in opposed fashion, the incoming air drawn through the chamber 48 may consist entirely of unheated outside air or entirely of return air from the building interior, or any combination of the two, depending upon the position of the dampers 43 and 45.

The heated air from the chamber 47 and the combination of the unheated outside air and recirculated or return air from the chamber 48 are combined in the chamber 49 and directed into the building through the outlet 59. Thus, with the burner 50 in operation the air entering the building may comprise from 20 percent to 100 percent outside air, with a maximum of 80 percent return air. When the burner is not in operation, the damper 42 may be closed so that the unit could admit 100 percent return air. However, it will be readily appreciated that in order to maintain the pressurization of the building it will be necessary to admit sufficient outside air to the building to replace that lost through openings in the building's skin.

All of the sensors 24, 25 and 26, the air handling unit 22, and the adjustable vent units 27 are functionally interrelated through the computer 23. Thus, in operation, the computer 23 is programmed to periodically poll each of the sensors 24, 25 and 26 to receive a signal indicative of the current pressure, temperature, air quality, or other parameter being observed at that particular location. The computer compares the signal indicative of the current condition to a stored signal representing the desired condition at that location. In order to permit early detection of changing trends in the conditions, the polling is preferably repeated at frequent a condition is observed which falls outside predetermined limits, or an undesirable trend is indicated upon successive observations, the computer initiates corrective measures with the appropriate air handling unit or units 22 or vent unit or units 27.

Maintenance of a slight positive pressure throughout the building interior is a basic requirement for proper operation of the system. A pressure on the order of 0.01 inch water, for example, has been found generally satisfactory. Thus, if a deviation from the desired pressure is observed at a particular pressure sensor 24, the computer 23 will adjust the dampers 43 and 45 of the appropriate air handling unit or units 22 to increase or decrease the proportion of incoming outside air and thereby to correct the pressure in the area. By way of example, if a sub-normal atmospheric pressure were observed and reported by the pressure sensor 24d (FIG. 1), the dampers 43 of the air handling units 22d and 22e might be opened and the dampers 45 correspondingly closed to increase the proportion of outside air being brought in, to thereby increase the atmospheric pressure in that area of the building. The computer is able to sense not only the existence of a deviation from the set pressure, but also the magnitude and trend of the deviation and to correspondingly modify the positions of the dampers 43 and 45 to gradually arrive at and maintain the correct pressure. In the unlikely event of overpressurization with the damper 43 entirely closed and outside air entering only through the damper 42 and chamber 47, an appropriate vent unit or units 27 will be opened in response to a computer command to relieve the pressure.

There is a natural migration of the air from beneath the air handling units, where it enters, to the periphery of the building, due to the pressure differential between the inside and outside of the building and consequent exfiltration through cracks and openings in the walls and at doors and windows. When the computer notes a temperature deviation at any of the sensors 25a through e, it initiates corrective action through the appropriate one or ones of the air handling units 22a through e. Thus, for example, if the temperature at the sensor is below the set point the computer will ascertain whether the burner 50 of the appropriate unit 22 is on. If it is not on, the computer will initiate the sequence of steps necessary to ignite it. When the burner is in operation, it will adjust the gas valve to increase the heat output and supply additional heat to the area. It is known that in order to avoid stratification and assure uniform heat distribution and comfortable working conditions, as well as to assure efficient operation, the temperature differential between the incoming air and the air in the interior of the building should be minimized. Thus, it is desirable that the temperature of the incoming air be between about 50 and 90 F. To that end, in accordance with the invention the burners 50 of such units will operate continuously during the heating season, with their heat output being modulated by the computer in response to signals from thermistor-type temperature sensors 25 to maintain the desired temperature. Should the temperature drop below the set point in a remote area as noted by a sensor 25 while the temperature in contiguous areas is well within the predetermined limits, the computer may send a signal opening the appropriate vent unit or units 27 to exhaust air and consequently cause migration of heated air into the area from the contiguous areas, while simultaneously increasing the heat output from the appropriate burner. Likewise, should the temperature in the remote area exceed the set point, heat input will be reduced or cooling will be increased and the appropriate vent unit or units 27 will be opened so that hot air is ejected and replaced by tempered air from contiguous areas until the temperature drops below the set point.

The air quality sensors 26 may, as indicated above, be of known types to detect the presence and amount of any of various gases or particulates in the air. For example, in certain industries it may be necessary for compliance with occupational safety and health standards to insure that the oxygen content of the air in the working area remains above a certain level or the content of noxious gases remains below a certain level. Likewise, the presence of smoke, haze and airborn particulates above a predetermined level is prohibited. To that end, the present invention is particularly suited to maintaining air quality within prescribed standards throughout the building. When the computer receives a series of signals from an air quality sensor 26 indicating a trend toward a deficiency or excess of an air component or an excessive particulate level, it will call for the opening of the appropriate one or ones of the adjustable vent units 27a through i by an appropriate amount, resulting in ejection of substandard air and replacement with air from the contiguous areas, and ultimately fresh air from the outside, to reverse the trend so that the air quality stays within prescribed limits. Should some activity within the building suddenly cause air quality in a particular area to fall outside the prescribed limits, the computer will immediately call for opening of the appropriate vent unit or units to eject the substandard air by the most direct route and thus prevent it from being distributed throughout the building. The air handling units, sensors and vent units are, of course, functionally interrelated and coordinated through the computer 23, so that opening of one or more vent units may initiate resetting of the dampers 43 and 45 in the second and third air inlet openings 41 and 44, respectively, and the burner 50 of appropriate air handling units to assure maintenance of the desired air pressure and temperature throughout the building.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

I claim:

1. A method of pressurizing an enclosed building having randomly located, uncontrolled leakage passageways between its interior and exterior, comprising admitting conditioned air to the building interior at a plurality of first locations throughout said building, periodically determining the atmospheric pressure at selected second locations within said building, and individually regulating the input of said conditioned air at each of said plurality of first locations in response to the observed atmospheric pressure at said selected second locations whereby said input at said plurality of first locations is coordinated to maintain the atmospheric pressure throughout said enclosed building above outside atmospheric pressure.

2. A method of pressurizing an enclosed building as claimed in claim 1, wherein said conditioned air admitted to said building comprises a combination of incoming outside air and building return air.

3. A method of pressurizing an enclosed building as claimed in claim 2, including the step of adjusting the proportion of incoming outside air and return air at each said first location in response to the observed atmospheric pressure at said second locations to maintain the atmospheric pressure throughout said enclosed building.

4. A method of pressurizing an enclosed building as claimed in claim 2, wherein said air admitted to said building interior is conditioned by heating said incoming outside air.

5. A method of pressurizing an enclosed building as claimed in claim 2, wherein conditioning of said air admitted to said building interior comprises cooling said incoming outside air and said building return air.

6. A method of pressurizing an enclosed building as claimed in claim 1, including the steps of generating signals representing said observed atmospheric pressures at said second locations, transmitting said signals to a central computer, comparing said signals to stored signals representing the desired atmospheric pressures at said second locations, generating signals representing deviations of said observed atmospheric pressures from said desired atmospheric pressures, and utilizing said latter signals to control said admission of conditioned air.

7. A method of pressurizing an enclosed building as claimed in claim 1, and further including maintaining the condition of the atmosphere throughout said enclosed building within predetermined parameters, comprising periodically determining a selected atmospheric condition at a plurality of third locations throughout said building, comparing the determined atmospheric conditions at said third locations with a predetermined desired condition for said third locations, and individually regulating the input of said conditioned air at the appropriate one or ones of said first locations in response to deviations of said determined atmospheric condition from said desired condition to thereby bring said atmospheric condition within said predetermined parameter.

8. A method as claimed in claim 7, wherein said selected atmospheric condition is at least one of the group consisting of temperature, humidity, concentration of particulate matter, smoke, haze, pollutants and noxious gases.

9. A method as claimed in claim 8, comprising periodically determining a plurality of said selected atmospheric conditions and individually regulating the input of said conditioned air at the appropriate ones of said first locations in response to deviations of said determined atmospheric conditions from said desired conditions to thereby bring said atmospheric conditions within said predetermined parameters.

10. A method as claimed in claim 8, wherein said conditioned air admitted to said building comprises a combination of incoming outside air and building return air.

11. A method as claimed in claim 8, including adjusting the proportion of incoming outside air and return air at each said first location in response to the observed atmospheric pressure at said second locations and to said deviations of said determined atmospheric condition from said desired condition at said third locations to maintain said atmospheric pressure and condition within said predetermined parameters.

12. A method as claimed in claim 8, including the steps of generating signals representing said observed atmospheric pressures at said second locations and said atmospheric conditions at said third locations, transmitting said signals to a central computer, comparing said signals to stored signals representing the desired atmospheric pressures and conditions at said second and third locations, generating signals representing deviations of said observed atmospheric pressures and conditions from said desired atmospheric pressures and conditions, and utilizing said latter signals to control said admission of conditioned air and said exhaust of air through said vent means.

13. A method of pressurizing an enclosed building having randomly located, uncontrolled leakage passageways between its interior and exterior, comprising admitting conditioned air to the building interior at a plurality of first locations throughout said building, periodically determining the atmospheric pressure at selected second locations within said building, and individually regulating the input of said conditioned air at each of said plurality of first locations in response to the observed atmospheric pressure at said second locations to maintain the atmospheric pressure throughout said enclosed building above outside atmospheric pressure, and further including maintaining the condition of the atmosphere throughout said enclosed building within predetermined parameters, comprising periodically determining a selected atmospheric condition at a plurality of third locations throughout said building, comparing the determined atmospheric conditions at said third locations with a predetermined desired condition for said third locations, and individually regulating the input of said conditioned air at the appropriate one or ones of said first locations in response to deviations of said determined atmospheric condition from said desired condition to thereby bring said atmospheric condition within said predetermine parameter, said building including controllable vent means at a plurality of locations around its peripheral walls, further comprising adjusting the appropriate one of said vent means in response to said deviations to thereby exhaust air from the area in which said atmospheric condition is outside said predetermined parameter and replace it with said conditioned air.

14. A method of pressurizing an enclosed building and maintaining the condition of the atmosphere throughout said enclosed building within predetermined parameters, said building having randomly located, uncontrolled leakage passageways between its interior and exterior and controllable vent means at a plurality of locations around its peripheral walls, comprising admitting conditioned air to the building interior at a plurality of first locations throughout said building, periodically determining the atmospheric pressure at selected second locations within said building and a selected atmospheric condition at a plurality of third locations throughout said building, comparing the determined atmospheric conditions at said third locations with a predetermined desired condition for said third location, individually regulating the input of said conditioned air at the appropriate one or ones of said first locations in response to the observed atmospheric pressure at said second locations and to deviations of said determined atmospheric condition from said desired condition at said third locations, and adjusting the appropriate one or ones of said vent means in response to said deviations, to thereby maintain the atmospheric pressure throughout said enclosed building above outside atmospheric pressure and to exhaust air from the area in which said atmospheric conditions is outside said predetermined parameter and replace it with said conditioned air.

15. A method as claimed in claim 14, in which said conditioned air admitted to said building interior at each said first location comprises a combination of incoming outside air and building return air.

16. A method as claimed in claim 15, including adjusting the proportion of incoming outside air and return air at each said first location in response to the observed atmospheric pressure at said second locations and to said deviations of said determined atmospheric condition from said desired condition at said third locations to maintain said atmospheric pressure and condition within said predetermined parameters.

* * * * *